United States Patent
Kussmaul et al.

(10) Patent No.: US 11,436,214 B2
(45) Date of Patent: Sep. 6, 2022

(54) PREVENTING SEARCH FRAUD

(71) Applicant: International Business Machines Corporation, Armonk, NY (US)

(72) Inventors: Timo Kussmaul, Boeblingen (DE); Daniel Blum, Stuttgart (DE); Kai Brennenstuhl, Boeblingen (DE); Thomas Steinheber, Maihingen (DE)

(73) Assignee: International Business Machines Corporation, Armonk, NY (US)

(*) Notice: Subject to any disclaimer, the term of this patent is extended or adjusted under 35 U.S.C. 154(b) by 570 days.

(21) Appl. No.: 16/384,978

(22) Filed: Apr. 16, 2019

(65) Prior Publication Data

US 2020/0334227 A1    Oct. 22, 2020

(51) Int. Cl.
G06F 16/00        (2019.01)
G06F 16/23        (2019.01)
G06F 16/2457      (2019.01)

(52) U.S. Cl.
CPC ...... G06F 16/2365 (2019.01); G06F 16/2379 (2019.01); G06F 16/24578 (2019.01)

(58) Field of Classification Search
None
See application file for complete search history.

(56) References Cited

U.S. PATENT DOCUMENTS

| | | | |
|---|---|---|---|
| 7,689,580 B2 | 3/2010 | Wang | |
| 7,895,181 B2 | 2/2011 | Shaw | |
| 8,135,615 B2* | 3/2012 | Bradley | G06Q 30/0225 |
| | | | 705/14.47 |
| 8,244,749 B1 | 8/2012 | Das | |
| 8,316,019 B1 | 11/2012 | Ainslie | |
| 8,442,987 B2* | 5/2013 | Leggetter | G06Q 30/0256 |
| | | | 707/749 |
| 8,793,573 B2 | 7/2014 | Beckmann | |
| 8,832,076 B2 | 9/2014 | Gutlapalli | |
| 9,098,497 B1 | 8/2015 | Brette | |
| 9,152,977 B2* | 10/2015 | Zwicky | G06Q 30/0248 |
| 9,165,079 B1 | 10/2015 | Kulick | |

(Continued)

FOREIGN PATENT DOCUMENTS

| | | | |
|---|---|---|---|
| JP | 2004112318 A | 4/2004 | |
| JP | 4042100 B2 | 2/2008 | |
| WO | 0119017 A1 | 3/2001 | |

OTHER PUBLICATIONS

"Amazon Cloudsearch", 7 pages, Jul. 3, 2018, copyright 2018, Amazon Web Services, <https://aws.amazon.com/cloudsearch/>.

(Continued)

*Primary Examiner* — Debbie M Le
(74) *Attorney, Agent, or Firm* — Alexander G. Jochym

(57) ABSTRACT

The invention relates to a method for preventing search fraud in a content management system. For an update of a content item of a search index of a search service provided by the content management system ranking metrics are calculated using a set of one or more search queries from a collection of search queries previously received by the search service. At least one statistic is computed using the calculated ranking metrics and compared with at least one statistic provided by a statistics history database. Depending on the result of the comparing, the update of the content item is flagged as fraudulent or as non-fraudulent.

20 Claims, 6 Drawing Sheets

(56) References Cited

U.S. PATENT DOCUMENTS

| | | | |
|---|---|---|---|
| 9,213,749 | B1 | 12/2015 | Collins |
| 9,361,317 | B2 | 6/2016 | Lightner |
| 9,384,226 | B1 | 7/2016 | Goel |
| 9,432,943 | B2 | 8/2016 | Alam |
| 9,519,715 | B2 | 12/2016 | Dedhia |
| 9,563,621 | B2 | 2/2017 | Halme |
| 9,697,016 | B2 | 7/2017 | Jacob |
| 9,697,258 | B2 | 7/2017 | Barton |
| 9,734,518 | B2 | 8/2017 | Suleman |
| 10,275,419 | B2 | 4/2019 | Dedhia |
| 10,440,030 | B2 | 10/2019 | Hind |
| 11,030,263 | B2 | 6/2021 | Bortnikov |
| 11,263,286 | B2 | 3/2022 | Brun |
| 2008/0208808 | A1 | 8/2008 | Sue |
| 2009/0125403 | A1 | 5/2009 | Li |
| 2010/0145896 | A1 | 6/2010 | Yuta |
| 2010/0223252 | A1 | 9/2010 | Broman |
| 2010/0250528 | A1 | 9/2010 | Punera |
| 2012/0078874 | A1 | 3/2012 | Gonzalez |
| 2012/0084291 | A1 | 4/2012 | Chung |
| 2012/0150831 | A1 | 6/2012 | Sun |
| 2013/0238783 | A1 | 9/2013 | Alexander |
| 2014/0358887 | A1 | 12/2014 | Morris |
| 2015/0026639 | A1 | 1/2015 | Nakamura |
| 2015/0161255 | A1 | 6/2015 | Battle |
| 2015/0309698 | A1 | 10/2015 | Senderek |
| 2016/0110460 | A1 | 4/2016 | Johnson |
| 2016/0259947 | A1* | 9/2016 | Negrea ............ G06F 21/31 |
| 2017/0031916 | A1 | 2/2017 | Sayyadi-Harikandehei |
| 2017/0147580 | A1 | 5/2017 | Buchmann |
| 2017/0169111 | A1 | 6/2017 | Baum |
| 2017/0201523 | A1 | 7/2017 | Palmer |
| 2017/0220605 | A1 | 8/2017 | Nivala |
| 2017/0357725 | A1 | 12/2017 | Hornkvist |
| 2018/0121556 | A1 | 5/2018 | Badros |
| 2019/0130444 | A1 | 5/2019 | Fei |
| 2020/0104305 | A1 | 4/2020 | Wei |
| 2020/0167433 | A1 | 5/2020 | Karayev |

OTHER PUBLICATIONS

"Autoregressive model", From Wikipedia, the free encyclopedia, Last edited Mar. 28, 2019, <https://en.wikipedia.org/wiki/Autoregressive_model>.
"Bayes' theorem", From Wikipedia, the free encyclopedia, Last edited on Mar. 16, 2019, <https://en.wikipedia.org/wiki/Bayes'_theorem>.
"Bayesian inference", From Wikipedia, the free encyclopedia, Last edited on Mar. 29, 2019, <https://en.wikipedia.org/wiki/Bayesian_inference>.
"Bayesian probability", From Wikipedia, the free encyclopedia, Last edited on Feb. 23, 2019, <https://www/en.wikipedia.org/wiki/Bayesian_probability>.
"Bayesian statistics", From Wikipedia, the free encyclopedia. Last edited on Apr. 12, 2019, 4 pages, https://en.wikipedia.org/wiki/Bayesian_statistics#cite_note-bda-1>.
"Conditional probability", From Wikipedia, the free encyclopedia, Last edited on Mar. 18, 2019, <https://en.wikipedia.org/wiki/Conditional_probability>.
"Errors and residuals", From Wikipedia, the free encyclopedia, last edited Dec. 28, 2018, <www.https://en.wikipedia.org/wiki/Erros_and_residuals>.
"Event (probability theory)", From Wikipedia, the free encyclopedia, Last edited on Mar. 25, 2019, <https://en.wikipedia.org/wiki/Event_(probability_theory)>.
"Frequentist probability", From Wikipedia, the free encyclopedia, Last edited on Mar. 14, 2019, <https://en.wikipedia.org/wiki/Frequentist_probability>.
"George E.P. Box", From Wikipedia, the free encyclopedia, Last edited on Mar. 29, 2019, <www.https://en.wikipedia.org/wiki/George_E._P._Box>.
"Gwilym Jenkins", From Wikipedia, the free encyclopedia, Last edited on Jan. 12, 2017, <www.https://en.wikipedia.org/wiki/Gwilym_Jenkins>.
"Headless Crawling", 2 pages, printed Jul. 3, 2018, copyright 2017 Ryte, <https://en.ryte.com/wiki/Headless_Crawling>.
"JaSpell::Java Spelling Checking Package", SourceForge, 2004 copyright Bruno Marins—XLDB Group, Apr. 12, 2019, 1 page, <http://jaspell.sourceforge.net/>.
"Limit of a sequence", From Wikipedia, the free encyclopedia, Last edited on Feb. 6, 2019, <https://en.wikipedia.org/wiki/Limit_of_a_sequence>.
"Linear combination", From Wikipedia, the free encyclopedia, Last edited Oct. 22, 2018, <https://en.wikipedia.org/wiki/Linear_combination>.
"Moving-average model", From Wikipedia, the free encyclopedia, Last edited on Dec. 8, 2018, <https://en.wikipedia.org/wiki/Moving-average-model>.
"Open-Source Content Management Systems Lack Security", 5 pages, Aug. 25, 2018, <https://expert.services/blog/managing-your-website/security/hacking-open-source-cms.html>.
"Peter Whittle (mathematician)", From Wikipedia, the free encyclopedia, Last Edited on Feb. 27, 2019, <https://en.wikipedia.org/wiki/Peter_Whittle_(mathematician)>.
"Probability distribution", From Wikipedia, the free encyclopedia, Last edited on Mar. 29, 2019, <https://en.wikipedia.org/wiki/Probability_distribution>.
"Probability interpretations", From Wikipedia, the free encyclopedia, Last edited on Feb. 28, 2019, <https://en.wikipedia.org/wiki/Probability_interpretations>.
"Probability", From Wikipedia, the free encyclopedia, Last Edited on Mar. 18, 2019, <https://en.wikipedia.org/wiki/Probability>.
"Stationary process", From Wikipedia, the free encyclopedia, Last edited on Mar. 15, 2019, <https://en.wikipedia.org/wiki/Stationary_process>.
"Statistical model", From Wikipedia, the free encyclopedia, Last edited on Apr. 1, 2019, <https://en.wikipedia.org/wiki/Statistical_model>.
"Statistics", From Wikipedia, the free encyclopedia, Last edited on Mar. 29, 2019, <https://en.wikipedia.org/wiki/Statistics>.
"The making of ERS 2.0—Getting Started with Cloud CMS", 17 pages, 2017, The Headless Meet Cloud CMS, <https://www.google.com/url?sa=t&rct=j&q=&esrc=s&source=web&cd=1&ved=0ahUKEwj-plSd85bcAhWDfisKHYqbBa4QFggnMAAA&url=https%3A%2F%2Fwww.cloudcms.com%2Fdownloads%2Fpdfs%2FThe_Making_of_ERS.pdf&usg=AOvVaw1A17jUjRveK-5zAixyNjus>.
"Time series", From Wikipedia, the free encyclopedia, Last edited on Mar. 13, 2019, <https://en.wikipedia.org/wiki/Time_series>.
Adhikari, et al., "An Introductory Study on Time Series Modeling and Forecasting", 67 pages, <https://arxiv.org/ftp/arxiv/papers/1302/1302.6613.pdf>.
Cleveland, et al., "STL: A Seasonal-Trend Decomposition Procedure Based on Loess", journal of Official Statistics, vol. 6, No. 1, 1990, pp. 3-73, <https://www.wessa.net/download.stl.pdf>.
Exalead, "Search-Based Applications (SBAs)", Exalead Solutions Brief: Search-Based Applications (SBAs), v 1.1 © 2010 Exalead, pp. 1-8.
Kauffman, "A Better Authoring Experience for Headless CMS's", Mar. 7, 2018, pp. 1-4, <https://www.bloomreach.com/en/blog/2018/03/a-better-authoring-experience-for-headless-cms%E2%80%99s.html>.
Mell et al., "The NIST Definition of Cloud Computing", Recommendations of the National Institute of Standards and Technology, Special Publication 800-145, Sep. 2011, 7 pages.
Rack Blogger, "Content Management System Comparison: Performance Optimization", Jan. 20, 2011, The Official Rackspace Blog, 3 pages, <https://blog.rackspace.com/content_management_system_comparison_performance_optimization>.
Whittle, Peter, "Hypothesis testing in time series analysis", Uppsala, Almqvist & Wiksells boktr. 1951, 120 pages, <https://www.worldcat.org/title/hypothesis-testing-in-time-series-analysis/oclc/22153644>.
Kussmaul, "Improved Navigation Paths Between Content Items", U.S. Appl. No. 16/384,977, filed Apr. 16, 2019.

(56) References Cited

OTHER PUBLICATIONS

Kussmaul, et al., "Automatic Adaption of a Search Configuration", U.S. Appl. No. 16/384,973, filed Apr. 16, 2019.
Kussmaul, et al., "Automatic Check of Search Configuration Changes", U.S. Appl. No. 16/384,974, filed Apr. 16, 2019.
Kussmaul, et al., "Managing Search Queries of a Search Service", U.S. Appl. No. 16/384,979, filed Apr. 16, 2019.
Kussmaul, et al., "Personalizing a Search of a Search Service", U.S. Appl. No. 16/384,981, filed Apr. 16, 2019.
Kussmaul, et al., "User-Driven Adaptation of Rankings of Navigation Elements", U.S. Appl. No. 16/384,975, filed Apr. 16, 2019.
List of IBM Patents or Patent Applications Treated as Related, Appendix P, Filed Herewith.

* cited by examiner

PREVENTING SEARCH FRAUD

BACKGROUND

The present disclosure relates to the field of electronic data processing and, more specifically, to preventing search fraud in a content management system.

Client applications, also referred to as search-based applications, may rely on a search service provided by a content management system to identify and retrieve information that is required for the functionality of the client application, like content and navigation elements. The client application sends during runtime search queries to the search service and retrieves the information that is required, e.g., for rendering application views from search results of the search queries. The application views present the content items retrieved from the search service of the content management system to a user of the client application.

SUMMARY

Various embodiments provide a method for preventing search fraud in a content management system as well as a computer program product and a computer system for executing the method as described by the subject matter of the independent claims. Advantageous embodiments are described in the dependent claims. Embodiments of the present invention can be freely combined with each other if they are not mutually exclusive.

In one aspect, the invention relates to a method for preventing search fraud in a content management system. The content management system comprises a search service. The search service comprises a search index with content items and a search engine. The content management system provides an authoring service which enables creating and editing content items. The content management system further comprises a content update validation component for identifying fraudulent updates of content items and a search query history component which comprises a collection of search queries previously received by the search service.

The method comprises creating an update of a content item of the search index using the authoring service. A set of one or more search queries is determined from the collection of search queries provided by the query history component. For each of the search queries of the set of search queries a ranking metric for the update of the content item as a search result of the respective search query is calculated. At least one statistic is computed using the calculated ranking metrics. The at least one computed statistic is compared with at least one statistic provided by a statistics history database. Depending on the result of the comparing, the update of the content item is flagged as fraudulent or as non-fraudulent.

In a further aspect, the invention relates to a computer program product comprising a non-volatile computer-readable storage medium having computer-readable program code embodied therewith for preventing search fraud in a content management system. The content management system comprises a search service. The search service comprises a search index with content items and a search engine. The content management system provides an authoring service which enables creating and editing content items. The content management system further comprises a content update validation component for identifying fraudulent updates of content items and a search query history component which comprises a collection of search queries previously received by the search service.

The preventing of the search fraud comprises creating an update of a content item of the search index using the authoring service. A set of one or more search queries is determined from the collection of search queries provided by the query history component. For each of the search queries of the set of search queries a ranking metric for the update of the content item as a search result of the respective search query is calculated. At least one statistic is computed using the calculated ranking metrics. The at least one computed statistic is compared with at least one statistic provided by a statistics history database. Depending on the result of the comparing, the update of the content item is flagged as fraudulent or as non-fraudulent.

In a further aspect, the invention relates to a computer system for preventing search fraud in a content management system. The content management system comprises a search service. The search service comprises a search index with content items and a search engine. The content management system provides an authoring service which enables creating and editing content items. The content management system further comprises a content update validation component for identifying fraudulent updates of content items and a search query history component which comprises a collection of search queries previously received by the search service.

The computer system comprises a processor and a memory storing machine-executable program instructions. Executing the program instructions by the processor causes the processor to control the computer system to create an update of a content item of the search index using the authoring service. A set of one or more search queries is determined from the collection of search queries provided by the query history component. For each of the search queries of the set of search queries a ranking metric for the update of the content item as a search result of the respective search query is calculated. At least one statistic is computed using the calculated ranking metrics. The at least one computed statistic is compared with at least one statistic provided by a statistics history database. Depending on the result of the comparing, the update of the content item is flagged as fraudulent or as non-fraudulent.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
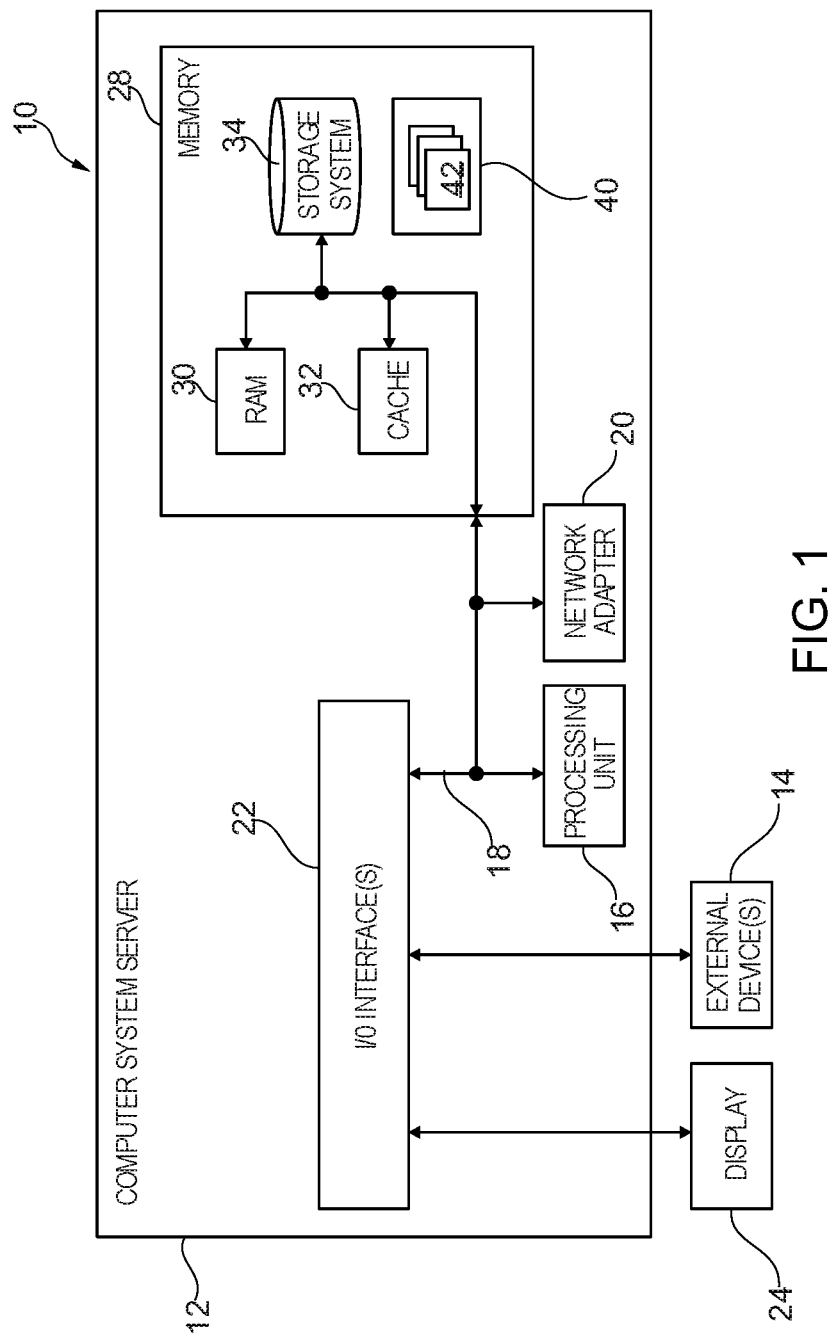
FIG. 1 depicts a schematic diagram illustrating an exemplary cloud computing node according to an embodiment.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of enabling a content management system to automatically detect and prevent fraudulent modifications of content items managed by the respective content management system. When a content author creates or modifies a content item, the content management system performs a validation in order to determine whether the modification of the content item is fraudulent.

For example, in web shop provided using a content management system there may be multiple sellers, each selling products in the web shop on his or her own account. The sellers may provide and edit content items, e.g., comprising product details, product images etc. The sellers may use an authoring service provided by the content management system to create, edit and/or upload content items. These content items provided by the sellers may be incorporated into the web shop built on top of the content management system, i.e., provided by the content management system.

A content author may try to manipulate content items in order to gain competitive or financial advantages over an owner of the web shop and/or over other competing sellers. A content author may, e.g., try to use search fraud, i.e., manipulation of the web shop's search results and rankings.

Search fraud comprises manipulating search results of a search engine and/or a ranking of the search results as well as providing search autocompletes, e.g., search suggestions, type aheads, etc. In order to execute a search fraud, a fraudulent content author may try to create manipulated content items, e.g., documents, assets like images, videos, etc., to create manipulated content metadata like tags, search keywords, etc., and/or to create manipulated search queries, e.g., by issuing fake search queries. Furthermore, a search fraud may be introduced unintentionally by importing manipulated content items from an untrusted content source.

For example, a seller as a content author may create a content item representing a product and assign it with tags not related to the represented product, but other popular products, which are high ranked as search results. The search engine may consider tags and other metadata assigned to content items for determining and ranking search results comprising the respective content items. Thus, in case of the above example of inappropriate tags, the respective product may get an inappropriately high ranking for search queries for relating to one of the inappropriate tags. In other words, a user using a search-based application to access the web shop looking for another popular product to which the inappropriate tags are actually related may receive the content item representing the respective product as a high-ranking result, even though the product may actual have no or only a minor relation to the object of the search query.

Embodiments may provide an effective anti-search fraud method for a cloud content management system. Embodiments may enable the content management system to detect potentially fraudulent updates of content items by analyzing a search ranking impact of the update.

According to embodiments, the comparing of the at least computed statistic with the at least one statistic provided by the statistics history database comprises calculating a difference between the at least computed statistic and the at least one statistic provided by the statistics history database. If the difference exceeds a first predefined threshold, the update of the content item is flagged as fraudulent, else the update of the content item is flagged as non-fraudulent.

Embodiments may have the beneficial effect that a search fraud may efficiently be detected based on a statistical evaluation of search results retrieved previously using content items comprised by the search index and search results taking into account the updated content item. Significant differences, exceed the predefined first threshold, may indicate a potential search fraud. A significant statistical deviation between said statistics may, e.g., be given in case the statistic computed using the calculated ranking metrics lies beneath three standard deviations of a statistic provided by the statistics database, i.e., by the previously used ranking metrics. In case of a significant deviation, the update may be flagged as fraudulent, i.e., as an outlier.

According to embodiments, the at least one computed statistic comprises one or more of the following: a mean deviation, a median absolute deviation, a standard deviation, a maximum absolute deviation, and a variance.

According to embodiments, the determining of the set of search queries comprises selecting search queries which have been used most frequently. Embodiments may have the beneficial effect of taking into account search queries most frequently used by one or more user. These search queries may be most relevant for the respective users. Thus, a potential search fraud targeting these search queries may have the greatest impact. Furthermore, a likelihood for being targeted by a search fraud, i.e., the risk of a search fraud, may be the highest for theses search queries.

According to embodiments, the determining of the set of search queries comprises selecting search queries related to the content item updated. Embodiments may have the beneficial effect that the statistical evaluation may be focused on search queries most likely influenced by a potential search fraud implemented in form of the respective update. According to embodiments, the determining of the set of search queries comprises selecting search queries configured for searching for the content item to be updated. According to embodiments, the determining of the set of search queries comprises selecting search queries configured for searching for the updated content item.

According to embodiments, the determined set of search queries is a predefined set of search queries. Embodiments may have the beneficial effect that a specific set of test search queries may be provided for the statistical evaluation. For example, the set of test search queries may comprise a representative cross-section of search queries used previously. Thus, the likelihood of detecting a search fraud may be increased.

According to embodiments, the calculating of the ranking metric for a search query of the set of search queries comprises: passing the respective search query and the update of the content item to the search service for executing the respective search query taking into account the update of the content item. A ranking metric for the update of the content item is received. The ranking metric indicates a relevance of the update of the content item as a search result of the respective search query. Search frauds may most likely be configured to increase the relevance of a content item for the users. Thus, using the relevance of content items for the statistical evaluation may increase the efficiency of detecting search frauds.

According to embodiments, the update of the content item is implemented, if the update is flagged non-fraudulent, else the update of the content item is blocked. Embodiments may have the beneficial effect that potentially fraudulent updates are prevented from being used.

According to embodiments, the blocked update of the content item is marked for review by an administrator. The administrator may decide, whether the update of the content item is indeed fraudulent and should be prevented from being implemented or whether the statistical difference has other reasons and the respective update is actually non-fraudulent. According to embodiments, the blocked update of the content item is discarded.

According to embodiments, the at least one computed statistic is stored in the statistics history database. According to embodiments, the calculated ranking metrics are stored in the statistics history database. Embodiments may have the beneficial effect that by updating the statistics history database current statistical developments may be taken into account for future evaluation.

According to embodiments, the update of the content item comprises one or more modification of the content item to be updated received from an external content author having authoring rights for the content item being updated. According to embodiments, the content update validation component manages a content author specific history of fraudulent updates assigned to the external content author and updates the history of fraudulent updates of the external content author depending on the flagging of the update of the content item. According to embodiments, further updates from the external content author are automatically blocked, if the fraudulent updates comprised by the content author specific history of fraudulent updates exceed a second predefined threshold.

Embodiments may have the beneficial effect of not only enabling to detect search frauds in form of individual updates, but to further identify external content author trying to implement search frauds. According to embodiments, the validation component may further maintain a content author specific history of fraudulent updates. Depending on the flag, the validation component may update content author specific history. If a content author exceeds a predefined threshold of fraudulent updates, the content validation component may automatically notify an administrator and/or blocking the respective content author, i.e., blocking all updates of content items from the respective user in future. For example, the blocking may be implemented by automatically flagging each update from the respective content author as fraudulent without further analysis of the respective update.

According to embodiments, a user specific history of test results of updates may be maintained. Embodiments may have the beneficial effect of enabling a use of the user specific history of test results to minimize false test positives.

According to embodiments, the search index comprises content items of a search query type for use as first search results for first search queries issued by a client application and used by the search service to search the search index for the content items of a search query type. The content items of the search query type comprise second search queries for use by the search service to search the search index for content items as second search results of the second search queries. The second search results are returned to the client application as search results for the first search queries.

A basic search-based application pattern based on second search queries provided as content items of a search query type may comprise a two-phase search process. By issuing one or more first search queries to the search service, the search-based application may retrieve content items, comprising content data, menu items, navigation elements, like links to other pages or views, to be presented to the user in an application view. The menu items and navigation elements are represented as content items in the search index, and may be managed i.e. created, read, updated and/or deleted (CRUD), through an authoring service. The search service executes the first search queries and returns the resulting content items to the search-based application. The resulting content items may be ordered according to a ranking computed by the search service or a sub-component of the search service.

According to the two-phase search process, the search results returned to the search-based application are not the first results retrieved by the search service executing the first search queries. The process rather uses second search queries provided as content items of the search query type. These second search queries are not managed by the client application. For example, the second search queries provided by the content items of the search query type are managed by a content management system. Thus, a personalized search of the search service may be implemented by personalizing the second search queries without a requirement to modify the client application.

In order to be able to provide personalized second search queries, the first search queries issued by the client application may comprise, e.g., an application identifier identifying the client application as well as an application view identifier of a certain application view of the client application as additional search parameters. Alternatively, a second search query identifier identifying a second search query may be added as an additional search parameter. Thus, the first search queries may search for specific second search queries or second search queries assigned to the respective application and/or application view. Theses second search queries may be personalized. Personalization may comprise modifying the search parameters of the respective second search query according to user individual preferences and/or assigning the second search query to the user or a user group comprising the user by adding a user identifier identifying the user or a user group identifier identifying the user group, respectively. The first search query may as part of a boost sub-query comprise the user identifier and/or the group identifier, thus ensuring that a potential personalized version of the second search query comprising the user identifier or user group identifier is higher ranked than a non-personalized version without the respective identifiers. The first query and its execution implement the first phase.

The second phase is implemented by the second search query and its execution enabling a personalized search. The search index of the search service comprises a set of content items representing second search queries. These content items are referred to as content items of the search type and may comprise a representation of a search query in a suitable syntax, e.g., in Solr query syntax, as well as a set of keywords used for finding and/or ranking the content item. These keywords may comprise a client application identifier identifying a client application and/or a second search query identifier identifying a second search query as well as optionally a user identifier identifying a user and/or a user group identifier identifying a user group. In case the second search query is personalized for multiple users or groups of users, there may be multiple personalized versions of one second search query for different users or user groups. The second search query may be created or modified either automatically, e.g., by a tool or an automatic adaptation method, or by a content author directly editing the corresponding content item of the search query type in the authoring service. The search service may find, rank and return a set of one or more second search queries in response to executing a first search query received from the client application.

A content management system managing the content items including the content items of the search query type may either automatically execute a top-ranked second search query and return the resulting second search result in reply to the first search query to the client application or may return a set of one or more ranked second search queries to the client application, which may execute the top-ranked second search query using the search service. The client application uses the second search results of the second search query received in reply to the first search query to render an application view. The client application may rely on the ranking of the second search results for selecting or sequencing content items, like menu items, navigation elements, etc. in the application view.

Modifying the second search query to take into account user-defined search query specifications may directly influences the user experience of the application without requiring a code change in the client application. An application view rendered using the second search result of the modified second search query may be defined by the user according to user individual preferences. Thus, the user experience of a search-based application may be enhanced. An intuitive and easy to use method for extending and personalizing a search-based application may be provided. Furthermore, user confidence and user productivity may be improved as well as maintenance and support costs be lowered. After the setup of the content items of the search query type, this method may be implemented to work automatically without requiring modifications and/or code changes in the client application.

In a service-oriented software architecture, a service refers to a software component which provides an application programming interface (API) configured to be accessible or invocable by other services or software components using a standard protocol or a standard invocation mechanism. A service may be implemented, created, removed, deployed, started and stopped independently of other services.

An API refers to a set of predefined methods of communication among software components. An API may comprise a set of subroutine definitions, communication protocols, and/or tools for building software. Thus, an API may provide a set of building blocks which may be combined for developing computer programs. An API specification defining an API may, e.g., comprise specifications for routines, data structures, object classes, variables, an/or remote calls.

In a service infrastructure, multiple instances of one service may be running in order to improve fault tolerance, throughput and load balancing of service requests. Each of the instances of the service may provide the same APIs and the same functionality. Each of the instances may be based on the same implementation, e.g., code, docker image and/or deployment artefact.

An interaction of a first service with a second service may comprise sending a service request for invoking an operation of one of the APIs provided by the second service. A service request may comprise an identifier of the requested API operation, e.g., in form of an URL or another parameter. In addition, a service request may comprise further data relevant for processing the service request.

A service infrastructure may comprise at least one service registry providing functionality for a service discovery and/or service lookup. A service registry may manage information about active, i.e., running, services of the service infrastructure. Before a first service invokes a second service, the first service may send a lookup request to the service registry containing a set of one or more criteria for selecting the second service, such as a service name and/or service identifier. A service name may be hardcoded in an implementation of the first service. Upon receipt of the lookup request, the service registry may select a service instance which adheres to the specified one or more criteria specified by the lookup request and return information about the selected service instance to the first service. The respective information may comprise an address, e.g., an URL, hostname, IP address and/or port, for use by the first service to create and send an invocation request to the second service. In case there is no service satisfying the one or more criteria specified by the lookup request, the service registry may return an error message.

A service registry may maintain information about a status and/or health of each service instance and consider only healthy services for service discovery requests, i.e., service lookup requests. In case a service instance becomes unresponsive and/or unhealthy, the service registry may no longer provide an address and/or information about the respective service instance to other services. The service registry may further incorporate a load balancing algorithm for distributing load between service instances, e.g., using random choice, round robin, and/or least connections.

A service may register at the service registry, e.g., immediately after starting. The registering may for example comprise sending a registration request including an address of the service to be registered. The registration request may further comprise data like, e.g., a service identifier and/or a set of identifiers of one or more APIs provided by the service to be registered. The service registry may, e.g., regularly, invoke a health check, e.g., in form of a status request, on each registered service. The invoked service may respond by returning status information. The status information may, e.g., comprise a flag indicating whether the respective service is healthy or unhealthy. If the returned status indicates a problem or if a service does not respond in time, the service registry may flag the respective service as unhealthy.

According to embodiments, a service registry may select a service instance based on two simple criteria: a binary flag representing a health status of the respective service and a service identifier, like, e.g., a service name.

A services infrastructure may be built using cloud computing. A computing component of the cloud may be separated from the Internet, e.g., by a firewall. An API gateway may provide access to client applications, i.e., client application programs, like mobile applications executed on a mobile communication device, e.g., a smartphone, to desktop applications executed on desktop computers, scripts executed in a browser, etc. An API gateway may receive requests issued by client applications and create a service lookup requests using the client requests. The service lookup requests may be sent to the service registry by the API gateway. In response to sending the service lookup requests, the API gateway may receive one or more addresses of service instances to be invoked and send invocation requests to the respective service instances. In response to sending the invocation requests, the API gateway may receive responses from the respective service instances and create one or more responses to the client request using the responses received from the service instances. The responses created by the API gateway may be returned to the requesting client applications.

While processing a request received from an API gateway, a service instance may need to invoke another service. For this purpose, the service instance may prepare a lookup request, send the prepared lookup request to a service registry, receive in response to sending the lookup request an address of a service instance and invoke the respective service instance using the received address.

Services may use state of the art software engineering mechanisms, like, e.g., caching, persistent storage, session and state management, connection and thread pooling, etc. For example, caching may improve performance. A computer system may cache, i.e., store in a cache memory, data that was recently used, e.g., while processing recent requests. Since requests may be distributed between service instances, individual service instances may have different cache entries. In other words, the state of a service instance may depend on an individual usage history of the respective service instance. Service performance may depend on whether data relevant for processing a request is available in a cache memory assigned to the respective service or not. Thus, service performance for processing the same request may differ between individual service instances. It is therefore preferable to intelligently select service instances for processing a request.

A service performance may depend on the data in a cache memory assigned to the respective service. However, there may be no standard for sharing detailed information about cache contents between service instances and service registries. Thus, this information may not be available during service lookup, e.g., for selecting a particular service instance.

A service infrastructure and a service implemented therein, like, e.g., a search service, may serve multiple users and multiple tenants. A tenant refers to a group of users, e.g., a company, who share a common access with specific privileges to a software instance, i.e., a service instance. The service infrastructure and implemented service may ensure that tenant specific data assigned to a particular tenant is isolated from other tenants. Client requests and service requests may comprise a tenant identification identifying a tenant which is associated with the respective requests. The tenant identification may enable the service infrastructure component to establish a context and state required for processing the respective requests.

A content management system (CMS) may manage a creation of digital content items, such as text documents, webpages, images, videos, code scripts, etc. A content management system may support multiple users in a collaborative environment. Modern enterprise-scale content management systems may be based on separate content authoring and content delivery systems. Thereby, different requirements of content creation and retrieval tasks may be met. A process responsible for creating, modifying and editing content may take place in the authoring system and be referred to as authoring. A process responsible for transferring content from the authoring system to the delivery system may be referred to as publishing. A content is either transferred as it is, e.g., text, video, images, static files, or in a transformed formed, e.g., in pre-render templates.

A content management system may provide an authoring user interface for editing and managing content items. A content management system may be configured as a headless CMS, i.e., may not provide a visual user interface, but rather provide a set of APIs, which may be called by client applications to create, edit and retrieve content items.

This may allow a client application to provide a user interface and functionality for content authoring as well as to invoke APIs to create, edit and retrieve content items.

An authoring system may allow content authors to create, edit and manage content items. The authoring system may include an authoring user interface or may just provide authoring APIs. Furthermore, the authoring system may allow to upload or import files.

A content management system may further provide a publishing system configured for publishing content items from the authoring system to a delivery system or component, like a content delivery network (CDN), to make the content available to the public. The publishing system may also incorporate further functionalities, like indexing content items in a search index, modifying, transforming or pre-rendering content items, etc. Publishing may be started manually by a content author, may be invoked on schedule or may be invoked via a publishing API operation.

A content management system may provide a functionality to define different types of content items. For example, the content management system may provide a predefined list of possible content item types. The type of a content item may, e.g., be selected by the user using an authoring system or component. The content management system may represent and store the content item type as a specific field in the content item. The respective field may, e.g., be named "type" or "classification". For example, a content management system may provide the following predefined content item types: "content", "asset", "page", "page template". A content management system and client applications, which retrieve and use the content items, may handle content items of different type separately. For example, a client application may use a first content item of type "page" to render a view of a page.

A content management system may be deployed in a cloud environment and implemented as a set of interacting services. An API gateway may provide an API to application programs, like, e.g., client application, authoring application, etc. and forward requests and responses between the respective applications and the services provided by the content management system.

A content management system may comprise a search service component or may alternatively use a search service external to the content management system. An authoring system may allow content authors to search for content items, a publishing system may index published content items in a delivery search index, thereby allowing client applications to search for content items. The authoring system may index content items in an authoring index, when a content item is created, updated or deleted. The publishing system may index content items during publishing. As part of publishing, the publishing system may further update a configuration of the search index and invoke a learning to rank method in a training mode in order to recalculate a ranking model.

End users may rely on a search service to find a certain content in the website, like, e.g., products in a web shop. Furthermore, content management system client applications may use the search to lookup content to be rendered and content for establishing, e.g., a page hierarchy for navigation. Therefore, search quality and relevance ranking of search results may be important for end users as well as for an operator of a website.

A search service may provide functionality for searching in unstructured data, like, e.g., text documents. For this purpose, a search service provides functionality to create a search index by indexing content items, i.e., data to be searched, like, e.g., text documents. A search index may contain a representation of a data content to be searched, in a representation which is suited, e.g., improved, for processing by the search service. The search service may provide an application programming interface API for indexing content items, which makes the respective content items searchable by the search service. Furthermore, the search service may provide a query API allowing a client, e.g., another service or an application, to issue a search query. A search query may contain a set of query parameters specifying search criteria for searching content items, like, e.g., a set of search terms. The search service may process the query by selecting and ranking a set of content items according to a search query. The ranking may determine a scoring or an order of the respective content items relative to the search query, which represents for each of the content items a level of relevance in relation to the respective search query. A search query may also contain parameters for controlling the ranking, like, e.g., a ranking query, a boost query and/or a boost function. Furthermore or alternatively, a search service may automatically select one or more heuristics and/or parameters for a search ranking. A search ranking may for example be based on statistics about the search index and the search terms used for a search. Furthermore, the search ranking may be based on statistics of an occurrence of search terms in specific content items.

For a ranking, e.g., the tf-idf method (term frequency-inverse document frequency) may be used, which is a numerical statistic intended to reflect an importance or relevance of a word for a document in a search index. Tf-idf values may be used in a search service as weighting factors in ranking a document's relevancy relative to a given search query. An tf-idf value increases proportionally to the number of times a word appears in a document and is offset by the frequency of appearance of the word in the search index.

A search service may manage multiple search indexes, e.g., assigned to multiple tenants. Thus, a search service may be used in a multi-tenant environment, e.g., by creating a separate search index for each tenant. In this case, search client services may be required to select the correct search index to use for search requests depending on a tenant context.

A search index may be associated with a specific search configuration, consisting of multiple configuration parameters defining settings which control search functionality, behavior and, e.g., the structure of the content items in a search index. Search configuration parameters may be updatable and/or changeable via a search service API or by uploading a set of configuration parameter changes, e.g., in form of one or more configuration files, to the search service, a file system or a persistent storage the search service is using.

A headless content management system may be used to support a programming model for client applications, herein referred to as search-based applications or search-based application programs. Search-based applications rely on a search service to identify and retrieve contents, navigation information, site structures and/or page structures, etc. that are required for the functionality of the respective application. For example, during runtime a client application may send a series of search queries to a search service and retrieve information required for rendering the current view of the application from the search query responses. In contrast to other programming models, the application may, e.g., not use databases, file systems or other persistency components for managing this information. In order to support the search-based application, the content management system may provide the search service for the search-based application.

Content authors may use the content management system to edit information that is relevant for the search-based applications, like site structures, page structures, navigation structures, and contents, as well as assets, like images, videos, etc. Using this information, content authors may further create new pages, author new content, define new content types and/or define new page types. A modified site may be reviewed, approved, and subsequently published using the content management system. A CMS publishing component used for publishing may index the data in a search service. Therefore, when the publishing is completed, the data may be available to search-based applications through interfaces of the search service.

A search-based application may rely on sending search queries to a search service to retrieve content and the navigation elements to be presented to a user. User interface components may be used for rendering information, like, e.g., page headers and page footers for rendering a page, site maps, trees, menus, or links for rendering the site structure or navigation structure, etc. This way, layout aspects may be separated from the content, site structure and navigation structure.

Embodiments may have the beneficial effect that search queries used by a search-based application are not hard-coded in the application code as defined by an application developer during development of the respective search-based application or provided in a properties file which is part of the respective application. Instead the search queries to retrieve data used by the search-based application, such as content items, are managed in the content management system. For this purpose, a second search query may be represented as a content item or a set of content items of a specific content type, i.e., the search query type. This allows a content author to use the normal authoring functionality to create and edit second search queries, which are handled like content items by the content management system.

The search queries of the search-based application are changeable without modifying the application. In order to be able to use modified search queries a user is not required to update or redeploy a modified version of the application comprising the modified search queries on a client device.

Embodiments may have the beneficial effect that by modifying the second search queries, i.e., the search results of the first search queries, the functionality of the search-based application may be influenced without requiring a code change in the search-based application.

According to embodiments, the computer program product further comprises computer-readable program code configured to implement any of the embodiments of the method for preventing search fraud in a content management system described herein.

According to embodiments, the computer system further is configured to execute any of the embodiments of the method for preventing search fraud in a content management system described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Video Electronics Standards Association (VESA) local bus, and Peripheral Component Interconnect (PCI) bus, such as, e.g., PCI, PCI-X and PCIe.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
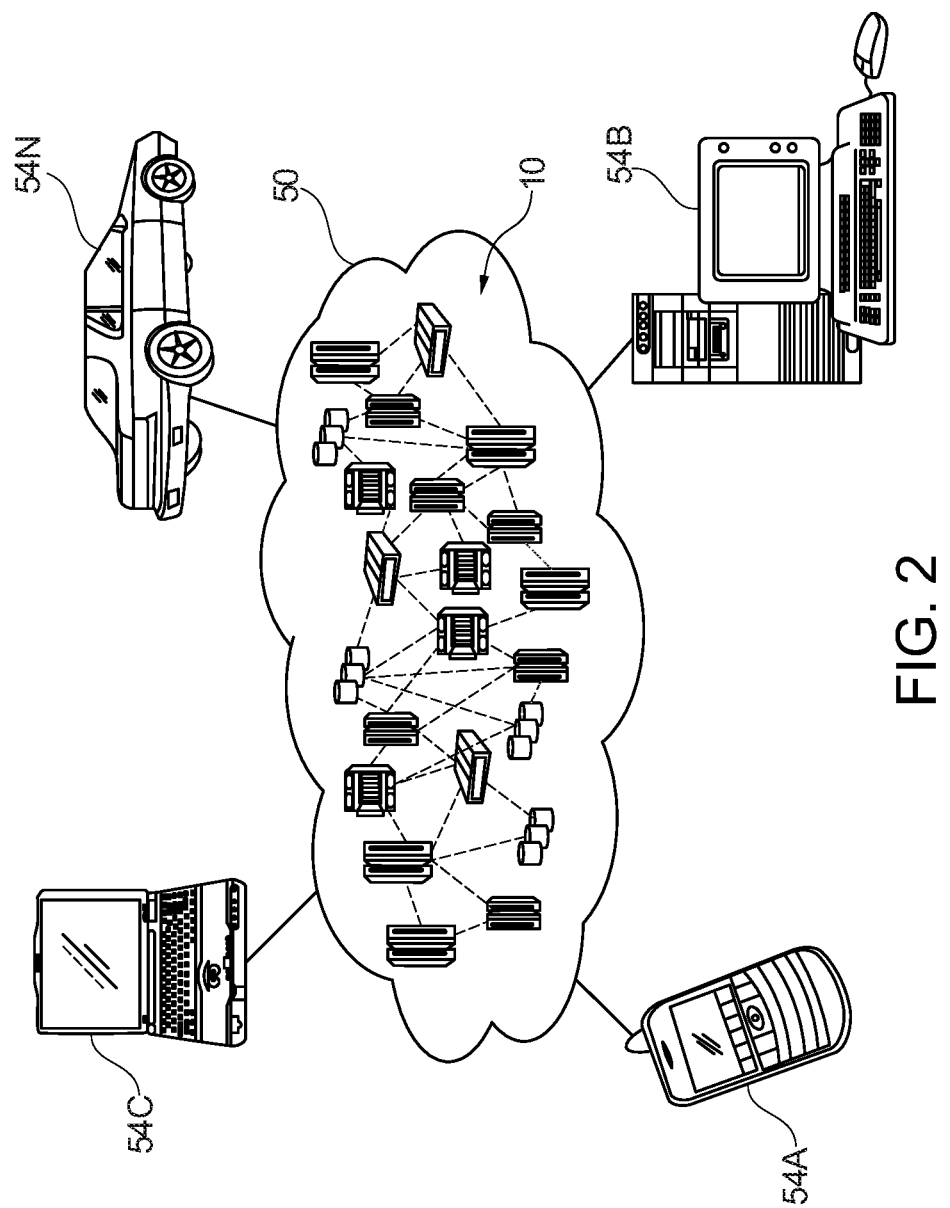
FIG. 2 depicts a schematic diagram illustrating an exemplary cloud computing environment according to an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
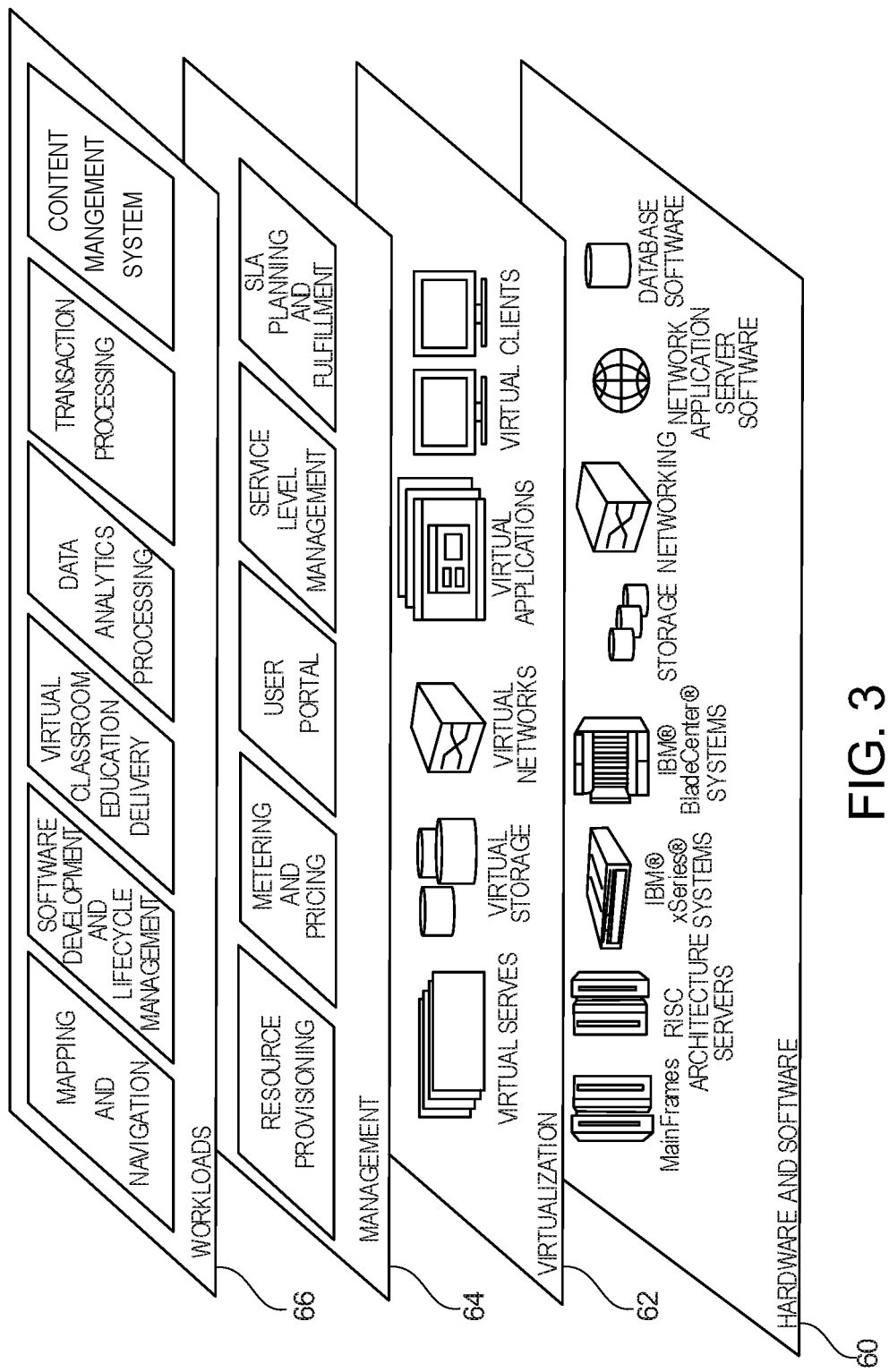
FIG. 3 depicts schematic diagram illustrating exemplary abstraction model layers according to an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. For example, cloud storage locations, e.g., a virtual storage of virtualization layer 62, may be provided. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. For example, the identity of a user trying to access storage locations provided by the cloud infrastructure may be verified. User portal provides access to the cloud computing environment for consumers and system administrators, e.g., access to storage locations provided by the cloud infrastructure. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; a content management system comprising a search service and configured for preventing search fraud.

Figure 4:
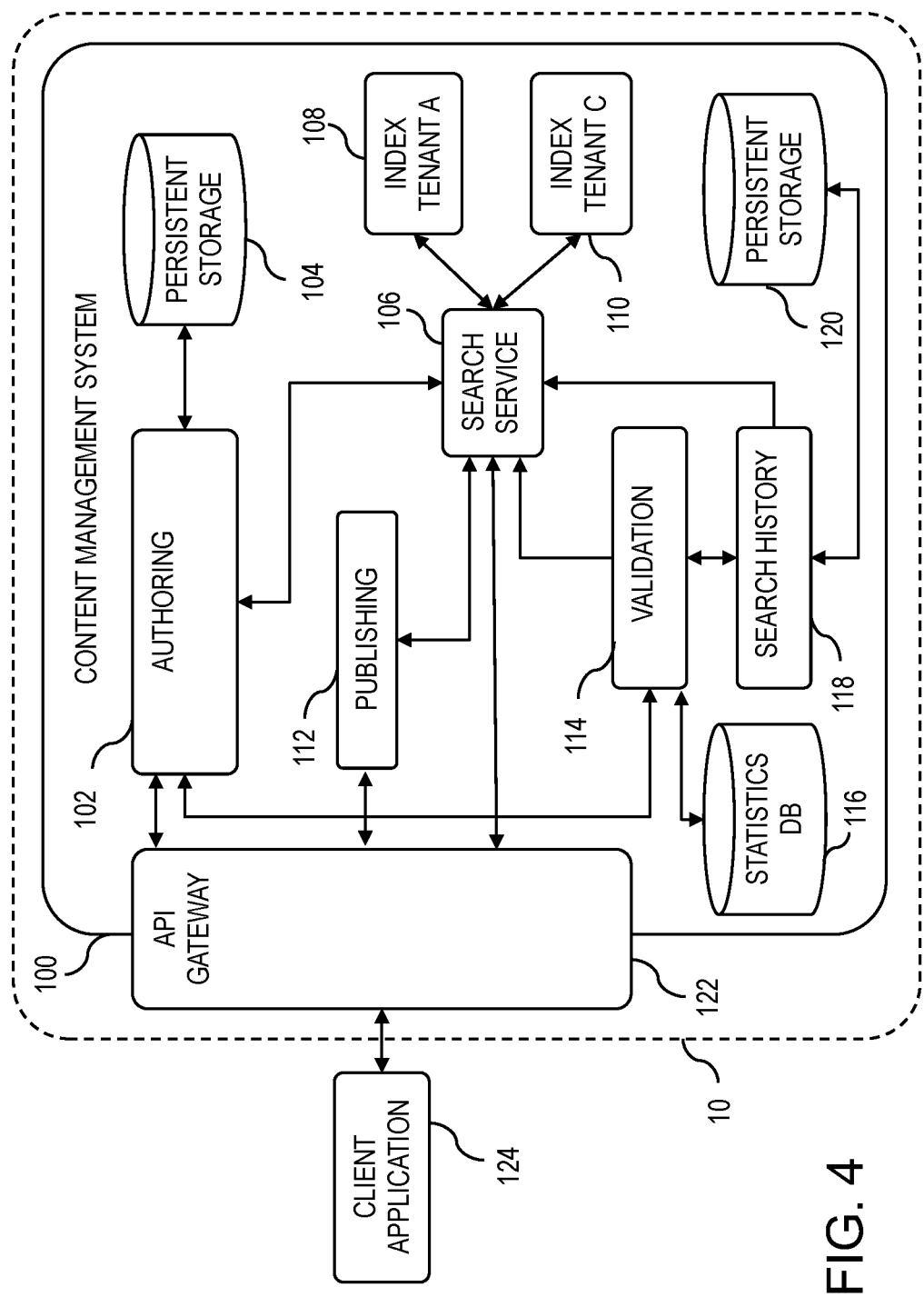
FIG. 4 depicts a schematic diagram illustrating an exemplary system for preventing search fraud in a content management system according to an embodiment.

FIG. 4 depicts a schematic diagram illustrating an exemplary system for preventing search fraud in a content management system 100. The system may comprise a computer system, e.g., a cloud computing node 10, which provides a content management system 100. The content management system 100 manages digital content items, in particular a creation and modification of digital content items. Digital content items may, e.g., comprise text documents, webpages, images, videos, code scripts, etc. The content management system 100 comprises an authoring component 102 providing an authoring service for creating, modifying and editing content items managed by the content management system 100 as well as a persistent storage 104 for storing the content items created, modified and/or edited by the authoring component 102.

The content management system 100 further comprises a search service 106. The search service 106 may provide a search engine, i.e., an information retrieval software program configured for information retrieval and presentation in response to search queries. The search engine is configured for searching one or more search indexes 108, 110 with content items managed by the content management system 100. The search indexes 108, 110 contain representations of data content to be searched. The representation may be configuring to improve processing of search queries. The content items comprised by the search indexes 108, 110 may, e.g., comprise content items of the search type providing second search queries. The search indexes 108, 110 may be tenant specific search indexes 108, 110, i.e., assigned to specific tenants. Depending on which tenant requests a search, the search service 106 may select one of the search indexes 108, 110 assigned to the requesting tenant. The search is then executed by the search engine according to the request using the selected search index 108, 110.

The content management system 100 comprises a search history component 118 configured for recording and maintaining the history of search queries received by the search service 106 from the client application 124 via the API gateway 122. The content management system 100 further comprises a validation component 114 configured for identifying fraudulent updates of content items attempt to be implemented into the search service 106 by the authoring service 102. The search history component 118 stores search queries previously received by the search service 106 as well as their respective search results in a persistent storage 120. The search history component 118 comprises an interface to the search service 106 to retrieve search queries executed by the search service 106 as well as their search results. The search history component 118 stores the search queries and search results in the persistent storage 120 in a suitable representation. The search history component 118 may further provide an interface to the validation component 114 enabling the validation component 114 to retrieve search history information.

The content management system 100 and more precisely the search service 106 may receive search queries, i.e., first search queries from the client application 124 via the API gateway 122. A client application 124 in form of a search-based application may rely on the search service 106 of the content management service 100 to identify and retrieve content items, e.g., comprising content data, navigation information, site structures and/or page structures, etc. that are required for the functionality of the respective client application 124. For example, the client application may send during runtime a series of search queries via the API gateway 122 to the search service 106. The search service 106 executes the search queries using one of the search indexes 108, 110 assigned to the user of the client application 124. Thus, the client application 124 is enabled of retrieving information required for rendering an application views from the search results received. Thus, the client application 124 may not require a database, file system or other persistency component for managing on its own.

Figure 5:
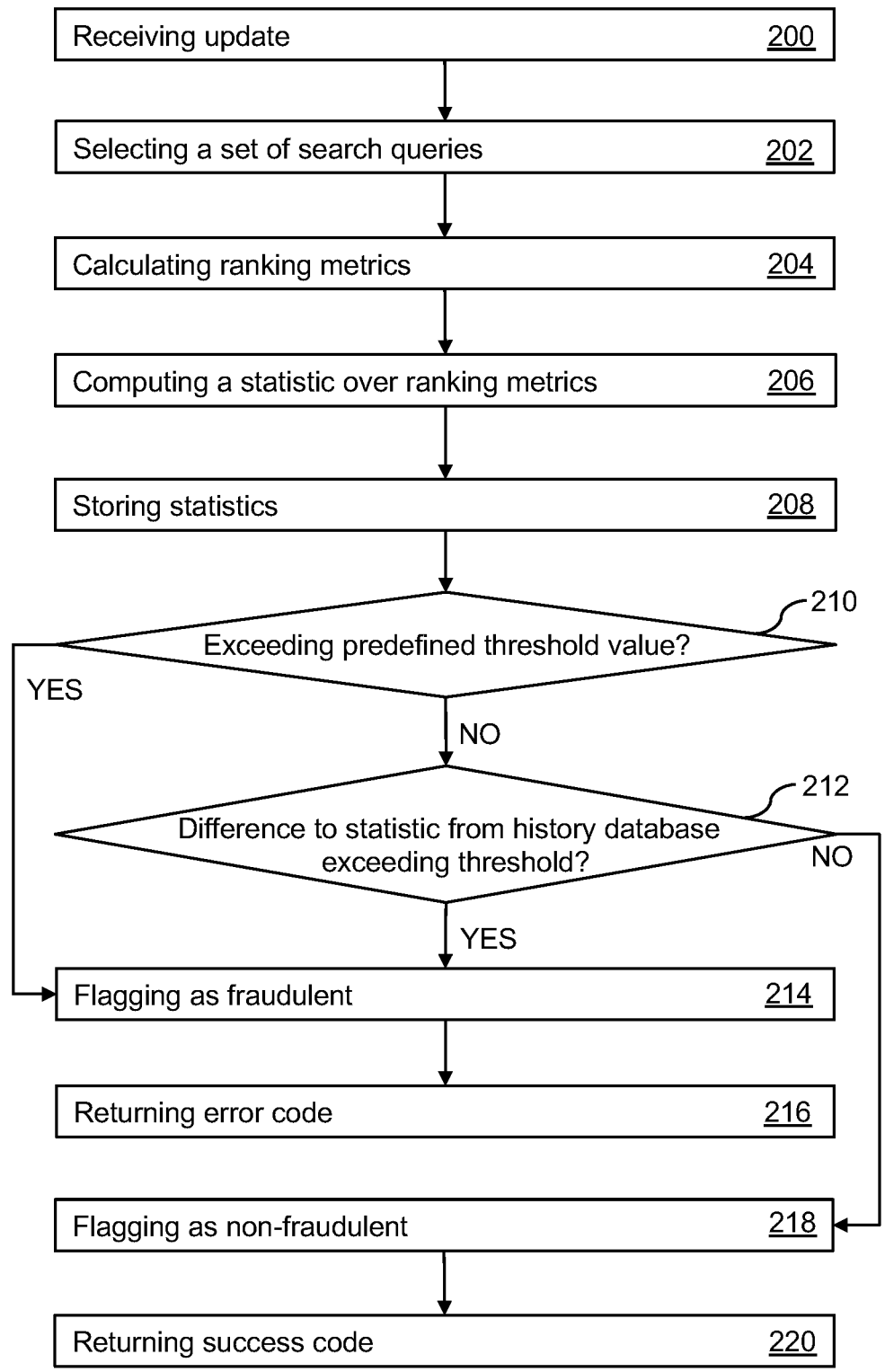
FIG. 5 depicts a schematic flow diagram of an exemplary method for preventing search fraud in a content management system according to an embodiment.

FIG. 5 depicts a schematic flow diagram of an exemplary method for preventing a search fraud in a content management system. An authoring service is configured to invoke the validation component if an update of a content item is to be implemented for use by the search service. The authoring service passes the respective update of a content item to the validation component. In block 200, the validation component receives the update of the content item from the authoring service. The validation component is configured for classifying updates of content items received from the authoring service either as fraudulent or as non-fraudulent. In block 202, the validation component invokes the search history component to select a set of search queries most relevant for the update of the content item from the search history database. For example, the search history component may select and return search queries most frequently used in a predefined time frame, e.g., the last two weeks. Alternatively or additionally, the search history component may return a set of predefined search queries. The predefined search queries may, e.g., be manually selected by an administrator from a collection of all search queries available in the search history component. Alternatively or additionally, the search history component may select and return search queries using a set of predefined keywords, e.g., product names. For each keyword, the search history component may select a set of most relevant search queries, e.g., the search queries comprising the respective keyword and being most frequently used in a predefined time frame, like the last two weeks. Alternatively or additionally, the search history component may select and return search queries in dependence on the updated content item. For example, search queries may be selected which search for the content item updated by the respective update.

In block 204, the validation component calculates for each selected search queries a ranking metrics, e.g., in form of a ranking score. For example, the validation component may use a ranking component provided by the search engine for ranking search results. The validation component may invoke the search ranking component to calculate the ranking metric for the updated content item and selected search query. In response, the validation component may receive and store the ranking metric. Alternatively, the validation component may comprise a ranking component similar to a ranking component used by the search engine. The result may be a set of ranking metrics, one ranking metric per selected search query. In block 206, the validation component computes one or more statistics over the set of calculated ranking metrics. For example, the validation component may compute a mean deviation, e.g., a mean signed deviation, a mean absolute deviation and/or a mean squared deviation; a median absolute deviation; standard deviation; maximum absolute deviation; variance; and/or other statistical dispersion related to the metrics. In block 208, the calculated metrics and/or computed statistics are stored by the validation component in a statistics history database. In block 210, the validation component further compares the one or more computed statistics against one or more predefined threshold values, e.g., a mean, median, standard deviation, variance etc., and flags the update of the content item as fraudulent in block 214, if at least one of the threshold values is exceeded. Else, the validation component, in block 212, further compares the at least one statistic with one or more statistics stored in the statistics history database and flags the update of the content item as fraudulent or non-fraudulent in dependence of a result of the comparing. For example, the validation component compares the mean, median, standard deviation, variance and flags the update of the content item as fraudulent in block 214, if a difference between the computed statistic and a statistic stored in the statistics history database exceed a predefined threshold. Else, the update of the content item is flagged as non-fraudulent in block 218. If the content update is flagged as fraudulent, the validation component in block 216 may return an error code to the authoring service indicating that the update is fraudulent. The authoring service may, e.g., automatically determine the content author responsible for the fraudulent update. Furthermore, an error workflow may be initiated. The workflow definition may, e.g., be predefined by an administrator. The workflow may, e.g., comprise requesting an administrator to review the fraudulent update and/or to discard the respective update. If the content update is flagged as non-fraudulent, the validation component in block 220 may return a success code to the authoring service indicating that the update is non-fraudulent. In response to receiving the success code, the authoring service may continue to process the update of the content item and implement the respective update for use by the search service.

Figure 6:
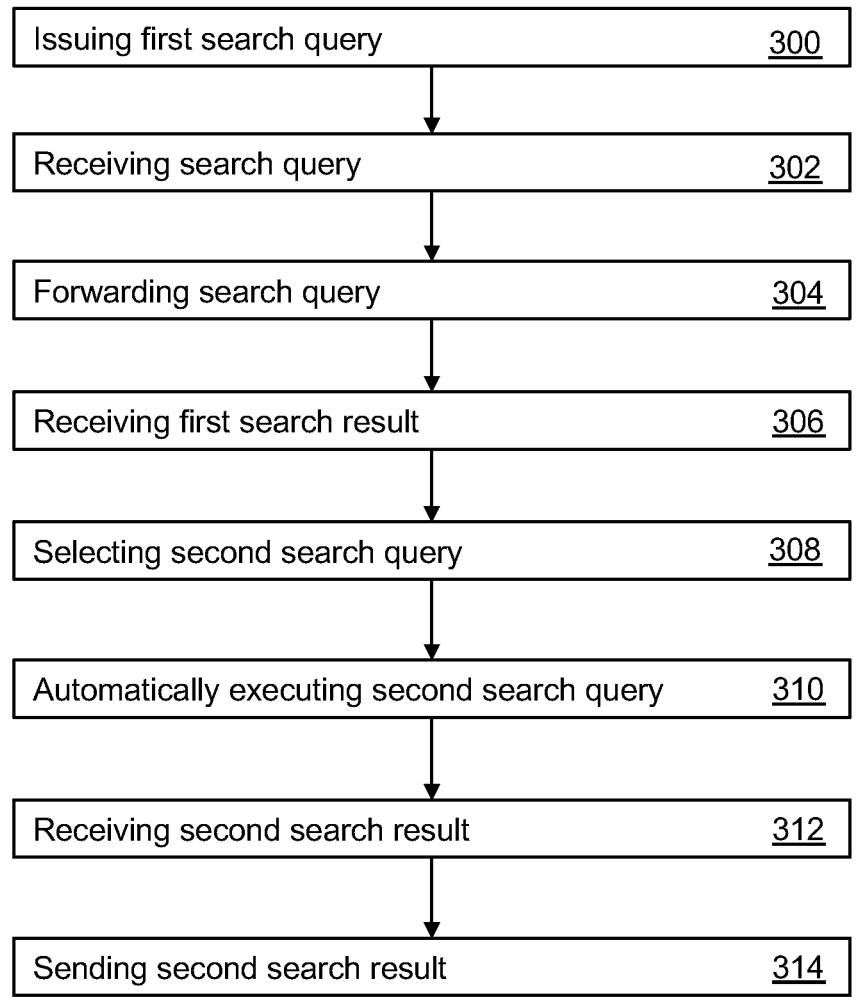
FIG. 6 depicts a schematic flow diagram of an exemplary method for managing search queries of a search service according to an embodiment.

FIG. 6 depicts a schematic flow diagram of an exemplary method for managing search queries of a search service. In block 300, the client application issues a first search query including a search query identifier identifying the respective first search query as well as a sub-query which boosts the at least one keyword. The respective boost-subquery may comprise a boosting factor assigned to the respective keyword. A boosting factor may be provided in form of a numerical factor assigned to a keyword and defining a relative boosting of search results comprising the respective keywords over search results not comprising the respective keyword. The respective keyword may, e.g., be a user identifier of a user of the client application and/or a set of one or more group identifiers identifying user groups to which the respective user belongs to. The user identifier and/or user group identifiers may be used to identify personalized second search queries. In block 302, the first search query issued by the search-based application is received by the content management system, e.g., by a search query management (SQM) component of the content management system. In block 304, the SQM component forwards the received first search query to the search service. In block 306, the SQM component receives an ordered set of one or more content items of the search query type as a first response to the first search query. The ordered set may, e.g., be received in form of a ranked list. The ordered set comprises at least one content item providing a second search query including the first search query identifier. The list may, e.g., be ranked based on the boosted keywords identified by the boost sub-query. If the set comprises multiple first search results for the first search query, content items comprising a boosted keyword, e.g., the user identifier, may be ranked higher. The ranking may be implemented taking into account the number of boosted keywords comprised by each first search result and/or weight factors, i.e. boosting factors, assigned to the respective boosted keywords. The more boosted keywords a first search result comprises and/or the higher the comprised boosted keywords are weighted, i.e., the larger the weight factors, the higher the first search result is ranked. In block 308, the SQM component selects one or more top ranked first search results. For example, the SQM component may select the top ranked first search result or a set of one or more top ranked first search results exceeding a predefined threshold. The threshold may define a number of one or more boosted keywords which first search results are required to comprise in order to be selected and/or a number which the accumulated weight factors of the boosted keywords have to exceed. In block 310, the SQM component retrieves one or more personalized second search queries from the selected one or more first search results and automatically executes the respective second search queries by invoking the search service. In block 312, the SQM component receives one or more second search results of the one or more executed second queries. In block 314, the SQM component sends the received one or more second search results as search results for the first search query to the client application. According to embodiments, the second search results may be received as an ordered set of one or more second search results, e.g., in form of a ranked list, and the top ranked second search results or a set of one or more second search results exceeding a predefined threshold may be selected for sending in block 314.

It is understood that one or more of the aforementioned embodiments of the invention may be combined as long as the combined embodiments are not mutually exclusive.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for preventing search fraud in a content management system, wherein the method comprises:
   receiving, by one or more computer processors, an update of a content item of a search index,
   determining, by one or more computer processors, a set of one or more search queries from a collection of search queries previously received;
   calculating, by one or more computer processors, a ranking metric for each search query of the set of search queries using the update of the content item;
   computing, by one or more computer processors, at least one statistic using the calculated ranking metrics;
   comparing, by one or more computer processors, the at least one computed statistic with at least one historic statistic; and
   depending on the result of the comparing, flagging, by one or more computer processors, the update of the content item as fraudulent or as non-fraudulent.

2. The computer-implemented method of claim 1, wherein the comparing of the at least computed statistic with the at least one historic statistic comprises:
   calculating a difference between the at least computed statistic and the at least one historic statistic; and
   responsive to the difference exceeding a first predefined threshold, flagging, by one or more computer processors, the update of the content item as fraudulent.

3. The computer-implemented method of claim 1, wherein the at least one computed statistic is selected from the group consisting of a mean deviation, a median absolute deviation, a standard deviation, a maximum absolute deviation, and a variance.

4. The computer-implemented method of claim 1, wherein the determining of the set of search queries comprises selecting search queries which have been used most frequently.

5. The computer-implemented method of claim 1, wherein the determining of the set of search queries comprises selecting search queries related to the content item updated.

6. The computer-implemented method of claim 1, wherein the determining of the set of search queries comprises selecting search queries configured for searching for the content item to be updated.

7. The computer-implemented method of claim 1, wherein the determining of the set of search queries comprises selecting search queries configured for searching for the updated content item.

8. The computer-implemented method of claim 1, wherein the determined set of search queries is a predefined set of search queries.

9. The computer-implemented method of claim 1, wherein the update of the content item is implemented, if the update is flagged non-fraudulent, else the update of the content item is blocked.

10. A computer program product for preventing search fraud in a content management system, wherein the computer program product comprises:
  one or more computer readable storage media; and
  program instructions stored on the one or more computer readable storage media, the program instructions comprising:
    program instructions to receive an update of a content item of a search index,
    program instructions to determine a set of one or more search queries from a collection of search queries previously received;
    program instructions to calculate a ranking metric for each search query of the set of search queries using the update of the content item;
    program instructions to compute at least one statistic using the calculated ranking metrics;
    program instructions to compare the at least one computed statistic with at least one historic statistic; and
    program instructions to, depending on the result of the comparing, flag the update of the content item as fraudulent or as non-fraudulent.

11. The computer program product of claim 10, wherein the at least one computed statistic is selected from the group consisting of a mean deviation, a median absolute deviation, a standard deviation, a maximum absolute deviation, and a variance.

12. The computer program product of claim 10, wherein the determining of the set of search queries comprises selecting search queries which have been used most frequently.

13. The computer program product of claim 10, wherein the determining of the set of search queries comprises selecting search queries related to the content item updated.

14. The computer program product of claim 10, wherein the determining of the set of search queries comprises selecting search queries configured for searching for the content item to be updated.

15. The computer program product of claim 10, wherein the determining of the set of search queries comprises selecting search queries configured for searching for the updated content item.

16. A computer system for preventing search fraud in a content management system, wherein the computer system comprises:
  one or more computer readable storage media; and
  program instructions, stored on the one or more computer readable storage media for execution by at least one of the one or more computer processors, the program instructions comprising:
    program instructions to receive an update of a content item of a search index,
    program instructions to determine a set of one or more search queries from a collection of search queries previously received;
    program instructions to calculate a ranking metric for each search query of the set of search queries using the update of the content item;
    program instructions to compute at least one statistic using the calculated ranking metrics;
    program instructions to compare the at least one computed statistic with at least one historic statistic; and
    program instructions to, depending on the result of the comparing, flag the update of the content item as fraudulent or as non-fraudulent.

17. The computer system of claim 16, wherein the at least one computed statistic is selected from the group consisting of a mean deviation, a median absolute deviation, a standard deviation, a maximum absolute deviation, and a variance.

18. The computer system of claim 16, wherein the determining of the set of search queries comprises selecting search queries which have been used most frequently.

19. The computer system of claim 16, wherein the determining of the set of search queries comprises selecting search queries related to the content item updated.

20. The computer system of claim 16, wherein the determining of the set of search queries comprises selecting search queries configured for searching for the content item to be updated.

* * * * *